March 26, 1957  H. L. MURRAY  2,786,447
POULTRY FEED DISPENSER
Filed July 23, 1954  2 Sheets-Sheet 1

INVENTOR.
HERBERT L. MURRAY
BY
McMorrow, Berman & Davidson
ATTORNEYS

March 26, 1957 H. L. MURRAY 2,786,447
POULTRY FEED DISPENSER
Filed July 23, 1954 2 Sheets-Sheet 2
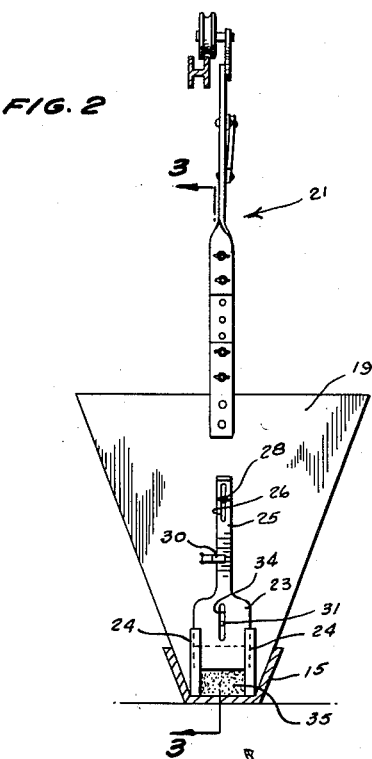
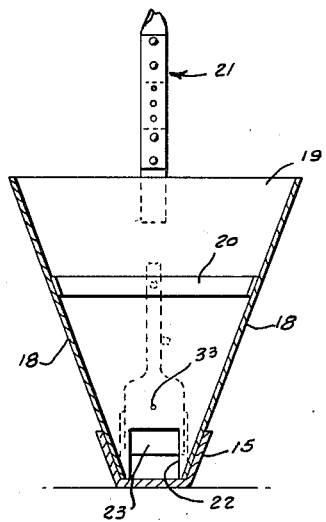
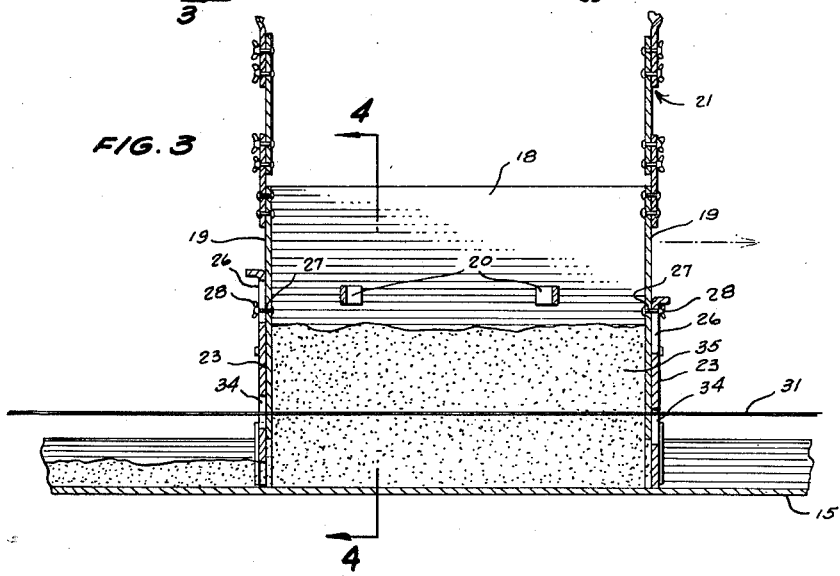
INVENTOR.
HERBERT L. MURRAY
BY
McMorrow, Berman & Davidson
ATTORNEYS

United States Patent Office 2,786,447
Patented Mar. 26, 1957

2,786,447
POULTRY FEED DISPENSER

Herbert L. Murray, Ocean View, Del.

Application July 23, 1954, Serial No. 445,281

1 Claim. (Cl. 119—52)

This invention relates to poultry feed dispensers.

An object of the invention is to provide an automatic device for filling a poultry feed trough to a predetermined level throughout its entire length.

Another object of the invention is to provide a convenient, easily actuated device for dispensing poultry feed at an even and uniform rate along the length of the feed trough.

Other objects and advantages of the invention will appear from the following description considered in conjunction with the attached drawings in which:

Figure 2 is an end elevational view, partially in section, of the assembly of Figure 1;

Figure 3 is a view taken along the line 3—3 of Figure 2; and

Figure 4 is a view taken along the line 4—4 of Figure 3.

Figure 1:
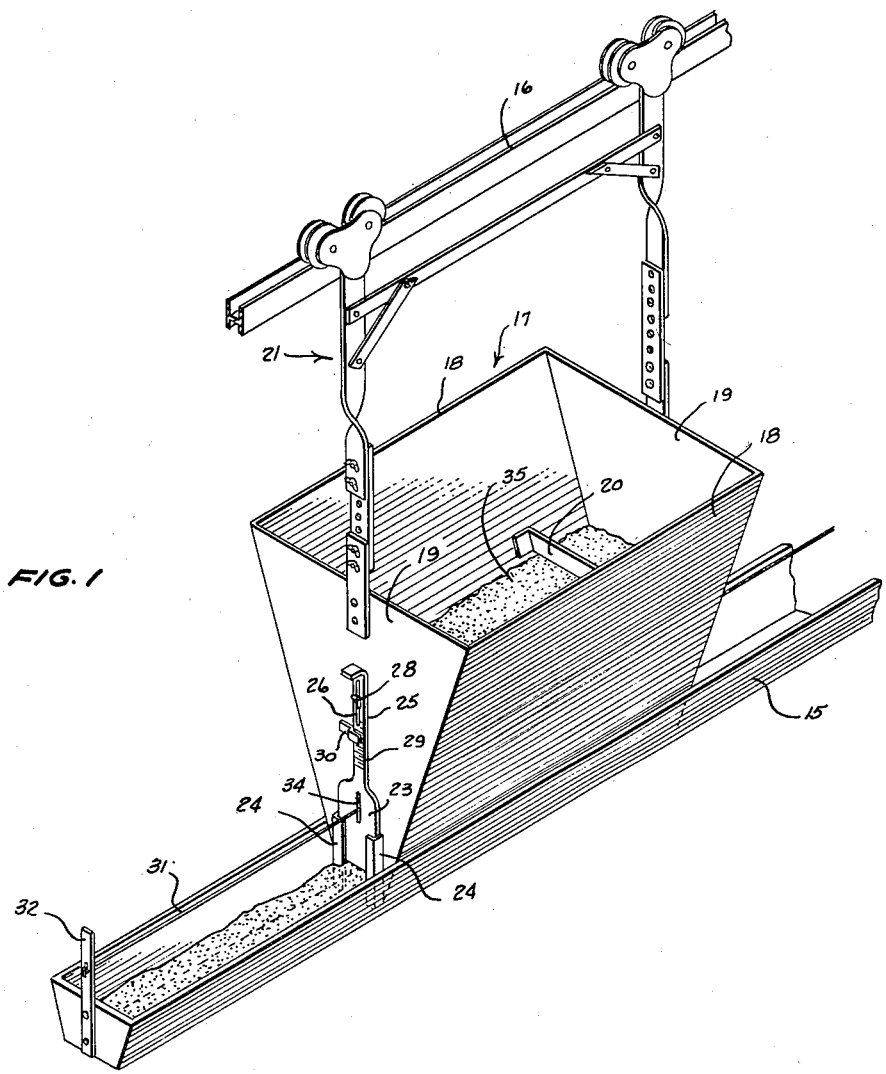
Figure 1 is a perspective view of a dispenser according to the present invention in the act of dispensing feed into a feed trough.

Referring to the drawings, the reference numeral 15 designates a poultry feed trough and the reference numeral 16 designates an overhead trackway spaced above and running longitudinally of the trough 15.

A hopper 17 is positioned above the trough 15 with its lower portion within the trough 15. The hopper 17 which is open at its bottom, and has a pair of opposed, downwardly converging side walls 18, and a pair of opposed, upstanding end walls 19 connecting the complemental ends of the side walls 18. The lower portions 18' of the sidewalls 18 slidably engage the divergent sidewalls 15' of the trough 15. A pair of spaced braces 20 extend from one sidewall 18 to the other to reinforce the hopper 17. The lower edges 13 and 13' of the hopper sidewalls and endwalls, respectively, slide upon the hopper bottom wall 14'.

Connecting the hopper 17 to the trackway 16 for movement of the hopper 17 longitudinally of the trough 15, is means, consisting of the carriage 21 rollably mounted on the trackway 16 and having depending end members 21' secured to the hopper endwalls 19.

Each end wall 19 of the hopper 17 has an opening 22 extending upwardly from the bottom edge 13' thereof and terminating at a point spaced from the top of the wall 19. The opening 22 extends upwardly to about the height of the sidewalls 15' of the trough 15 and is of sufficient width to permit feed to move freely from the hopper 17 therethrough.

Arranged on the outside of each of the end walls 19 and closing the opening 22 in each of said end walls 19, is an upstanding gate 23, connected to the adjacent wall for vertical movement from its closing position to an open position. Each gate 23 is slidably supported against the adjacent end wall 19 by a pair of upstanding angle irons 24, connected to the wall 19 and slidably engaging the opposed edges of the gate 23. A stem 25, having a longitudinally extending closed slot 26 therein, projects upwardly from the top of each gate 23.

Carried by each of the end walls 19, is means engageable with the complemental gate 23 for securing the gate 23 in any selected position of its vertical movement to open position, the lower edges 23' of the gates 23, when secured in their selected positions of vertical movement to open position, serving to regulate the level of the feed in the trough 15. The means consists of a bolt 27 which extends outwardly through the related wall 19 and through the slot 26 in the stem 25 of the related gate 23 and has its shank end engaged by a wing nut 28, exteriorly of the stem 25, the tightening of the wing nut 28 against the stem 25 being effective to hold the gate 23 in any of its vertical positions. Each stem 25 is marked with graduations 29 which may be read with reference to a finger 30 attached to the related wall 19 and overlapping the stem 25 intermediate its ends, to indicate the vertical movement position of the gate 23 at any time.

A wire 31 is stretched longitudinally of and spaced above the center of the trough 15 to prevent chickens from climbing into the trough. The wire 31 is supported at its ends by standards 32 erected upon the ends of the trough 15 and passes through an aperture 33 in each of the end walls 19 of the hopper 17 and through a slot 34 in each of the gates 23.

To use the dispenser of the present invention, the hopper 17 is moved to one end of the trough 15, the gates 23 are moved downwardly to their closed positions and the hopper 17 is filled with feed 35. The gate 23 facing said one end of the trough 15 is then opened, to a height corresponding to the depth to which it is desired to spread the grain in the trough 15, and is secured in that position by tightening the wing nut 28. The hopper 17 is then moved toward the other end of the trough 15 and as it moves the feed 35 escapes through the open portion of the opening 22 and is deposited in the trough 15 to a depth equal to the distance between the lower edge of the gate 23 and the bottom wall 14' of the hopper 17. When the hopper 17 has reached the other end of the trough 15, the open gate 23 is closed and the hopper 17 is allowed to remain at the other end of the trough 15 until the trough 15 needs refilling, when the other gate 23 may be opened to the desired height and the hopper 17 moved back to the starting end of the trough 15, so as to refill the trough through the other opening 22. The setting of the gates 23 may be accurately gauged by means of the markings 29 upon the stems 25 read with respect to the adjacent fingers 30.

As the foregoing description indicates, the dispenser of the present invention provides a convenient and easily actuated device for filling the entire length of a poultry feed trough to a desired level by the mere movement of the dispenser along the trough. The parts are simple and durable and are easily adapted to use in a poultry house or poultry yard.

What is claimed is:

In a feed dispensing structure, an elongated horizontal feed trough having upwardly divergent sidewalls and a bottom wall, a trackway supported over and parallel to the trough, a carriage suspended from and movable along the trackway, an open bottom hopper secured to and depending from the carriage, said hopper having endwalls and downwardly converging sidewalls, said endwalls and sidewalls having lower ends sliding upon the trough bottom wall and said hopper sidewalls having lower portions slidably engaged with the trough sidewalls, said endwalls having openings extending upwardly from the lower edges of the endwalls, and vertically adjustable gate means on said endwalls for covering said openings.

References Cited in the file of this patent

UNITED STATES PATENTS

| | | |
|---|---|---|
| 1,518,664 | Maryott | Dec. 9, 1924 |
| 1,977,513 | Holbeck | Oct. 16, 1934 |
| 2,302,314 | Haggart | Nov. 17, 1942 |
| 2,591,609 | Roberts et al. | Apr. 1, 1952 |
| 2,601,057 | Roberts et al. | June 17, 1952 |
| 2,659,346 | Paparazzo et al. | Nov. 17, 1953 |
| 2,685,863 | Martin | Aug. 10, 1954 |